United States Patent [19]

Hoshino

[11] Patent Number: 5,586,108
[45] Date of Patent: Dec. 17, 1996

[54] INFORMATION RECORDING MEDIUM AND INFORMATION RECORD REGENERATING DEVICE THEREFOR

[75] Inventor: Takashi Hoshino, Yokohama, Japan

[73] Assignee: Hitachi, Ltd., Tokyo, Japan

[21] Appl. No.: 492,182

[22] Filed: Jun. 23, 1995

[30] Foreign Application Priority Data

Jun. 27, 1994 [JP] Japan .................................. 6-144330

[51] Int. Cl.[6] ...................................................... G11B 7/00
[52] U.S. Cl. ........................... 369/275.3; 369/59; 369/58; 369/48; 360/48; 360/53
[58] Field of Search ................................ 369/53, 54, 58, 369/59, 60, 47, 48, 49, 275.3, 275.4, 32; 360/33.1, 38.1, 39, 40, 45, 48, 49, 53; 371/30, 37.1, 37.7, 40.4

[56] References Cited

U.S. PATENT DOCUMENTS 5,363,362  11/1994  Maeda et al. .............................. 369/54

OTHER PUBLICATIONS

Standard ECMA-154 Data Interchange on 90 mm Optical Disk Cartridges, Read Only and Rewritable, M.O., ECMA (European Computer Manufacturers Association), Jun. 1991, pp. 34–50, 61–63 and 75–78 (Provided in English).

Primary Examiner—Muhammad N. Edun
Attorney, Agent, or Firm—Fay Sharpe Beall Fagan Minnich & McKee

[57] ABSTRACT

Reliability of data is improved by increasing the length of burst error correction of recorded data. Instead of the conventional error correcting codes produced in a sector, error correcting code interleaved among sectors is generated. Otherwise, double codes are formed by decreasing parity number of the conventional error correcting codes produced in the sector and adding error correcting code interleaved among the sectors instead. The length of burst error correction of recorded data is increased by interleaving error correction code among the sectors. Further, the efficiency of use of disk can be improved since parity sector is not used and, in addition to this, the speed of processing can be improved since there is no need to read out unnecessary sectors during correction.

25 Claims, 5 Drawing Sheets

FIG. 3

INFORMATION RECORDING MEDIUM AND INFORMATION RECORD REGENERATING DEVICE THEREFOR

BACKGROUND OF THE INVENTION

The present invention relates to a method of correcting information error in a device for recording and regenerating information to and from a disk-shaped recording medium, and more particularly relates to an error correction method suitable for a read only memory disk for recording data at the time of manufacturing the disk.

An optical disk has been used for a recording means for recording a large quantity of information. The Optical disk records and regenerates information by utilizing rotation of optical plane of polarization due to Kerr effect or Faraday effect or difference in refractivity due to difference in heating temperature. The optical disk records information with pits and projections at manufacturing time, and has a characteristic in that it can be easily manufactured as a non-rewritable read only memory disk and can regenerate information using a record regenerating device for rewritable disk. This characteristic makes it possible to distribute a large quantity of information with low price, and accordingly international standards for optical disk, for example, ISO, ECMA and so on, are established as an important technology in the multimedia era.

However, since the optical disk has a large error rate comparing to the conventional magnetic disk, use of error correcting code is a prerequisite. The types of error occurrence in optical disk can be classified into random error and burst error. The random error is caused by noise, and occurs by bit unit. The burst error is caused by faults, foreign objects or flaws in disk, and occurs by continuous bits. The sector in a 90 mm optical disk according to ECMA standard (ECMA-154) is composed of 512 bytes of user data, 4 bytes of vender unique data, 4 bytes of error detecting code by cyclic code (CRC; cyclic redundancy check character), 80 bytes of error correcting code (ECC) parity by Read-Solomon code. The error correcting code producing sequence is that the total of 520 bytes for the user data, vender unique data, CRC are divided 104 bytes each every 5 bytes, ECC parity of 16 bytes is produced and 5 sequences of error correcting sequences are formed in the whole sectors (5 interleave). The correcting capability of the error correcting code is up to 8 byte error in each correcting sequence for random error, and 40 byte error in the whole sectors. For burst error, the correcting capability is continuous 40 byte error per each sector. However, in a practical optical disk, a random error and a burst error are occurred at a time and the burst errors within correctable number steadily occur. If a random error occurs in such a state, the correction cannot be performed as the result even if the number of random errors is within correctable range. Therefore, the number of the steadily occurring burst errors must be decreased during data recording as few as possible. In this reason, in a rewritable disk device, when number of errors in the regenerating time of information just after recording exceeds a certain value even if the number is within the error-correctable number, the information is rewritten in another position. However, an ROM disk in which information is recorded by pre-bit at manufacturing time cannot be rewritten as described above. Therefore, one sector of parity sector is provided per 25 sectors according to ECMA-154 standard, and data placed in the same position in each sector is executed with exclusive-OR (EOR) every byte to record it to the parity sector.

However, in this method, the recording efficiency is decreased since sectors for parity are separately required in addition to sectors for data. Further, correction cannot be often executed when the burst error and the random error occur at a time since one correcting sequence can correct only one byte. Therefore, a higher error correcting capability is required.

SUMMARY OF THE INVENTION

An object of the present invention is to provide a recording medium and an error correcting method where the burst error correcting capability and the reliability of recording data can be improved, and the usability of medium can be increased without providing special parity sectors, and the processing speed can be improved without reading out any new sector when correction is required. In addition to these, the present invention can be applied by recording file unit, and the recording medium can be easily performed on a driving device and can be used not only as a read only disk, but as a write-once disk or a rewritable disk.

In order to attain the above object, according to the present invention, the error correcting code sequences are dispersedly arranged among sectors of information recording blocks. The regenerating device has a memory means for storing data in a plural dispersed sectors and a correcting means. As another method, two kinds of the error correcting code sequences are provided, one sequence is dispersedly arranged inside a sector, and the other sequence is arranged among sectors. The regenerating device has a memory means for storing data in a plural dispersed sectors, a first correcting means for correcting the data dispersedly arranged among sectors and a second correcting means for correcting the data dispersed inside a sector. Otherwise, the regenerating device has one error correcting means for sequentially correcting the data dispersed inside a sector and the data dispersedly arranged among sectors.

For the data sequence to produce the error correcting codes, one byte of data is used in order of sector 0, sector 1, sector 2, . . . , sector n, sector 0, . . . one by one, and the produced error correcting codes are recorded in the recording medium following to the data. In the regenerating device, regenerated data from sector 0 to sector n is stored in a memory means, and read out the data and the error correcting codes from the memory means in the same sequence as that at producing the error correcting codes to correct the data in an error correcting means. The corrected data is read out from the memory means in the sector order and is output to a host device.

In addition to this, error correcting codes are produced from the data in the sectors, and the produced error correcting codes are stored in the same sectors. In the regenerating device, the regenerated data from sector 0 to sector n is stored in the memory means, and read out the data and the error correcting codes from the memory means to correct the data in the sectors. After performing the correcting process for all the sectors, the data of the data sequence and the error correcting codes dispersed among the sectors are read out from the memory means in order of sector 0, sector 1, sector 2, . . . , sector n, sector 0, . . . one by one to preform the error correction. By performing the error corrections twice to one-byte data, the correction capability is improved.

As to another method, the error correction in the sectors is performed while the data from sector 0 to sector n is being stored in the memory means, and the error correction among the sectors is performed when an error not corrected by this process appears.

BRIEF DESCRIPTION OF THE DRAWINGS

FIG. 3 shows the second embodiment in accordance with the present invention.

DETAILED DESCRIPTION OF THE PREFERRED EMBODIMENTS

Figure 1:
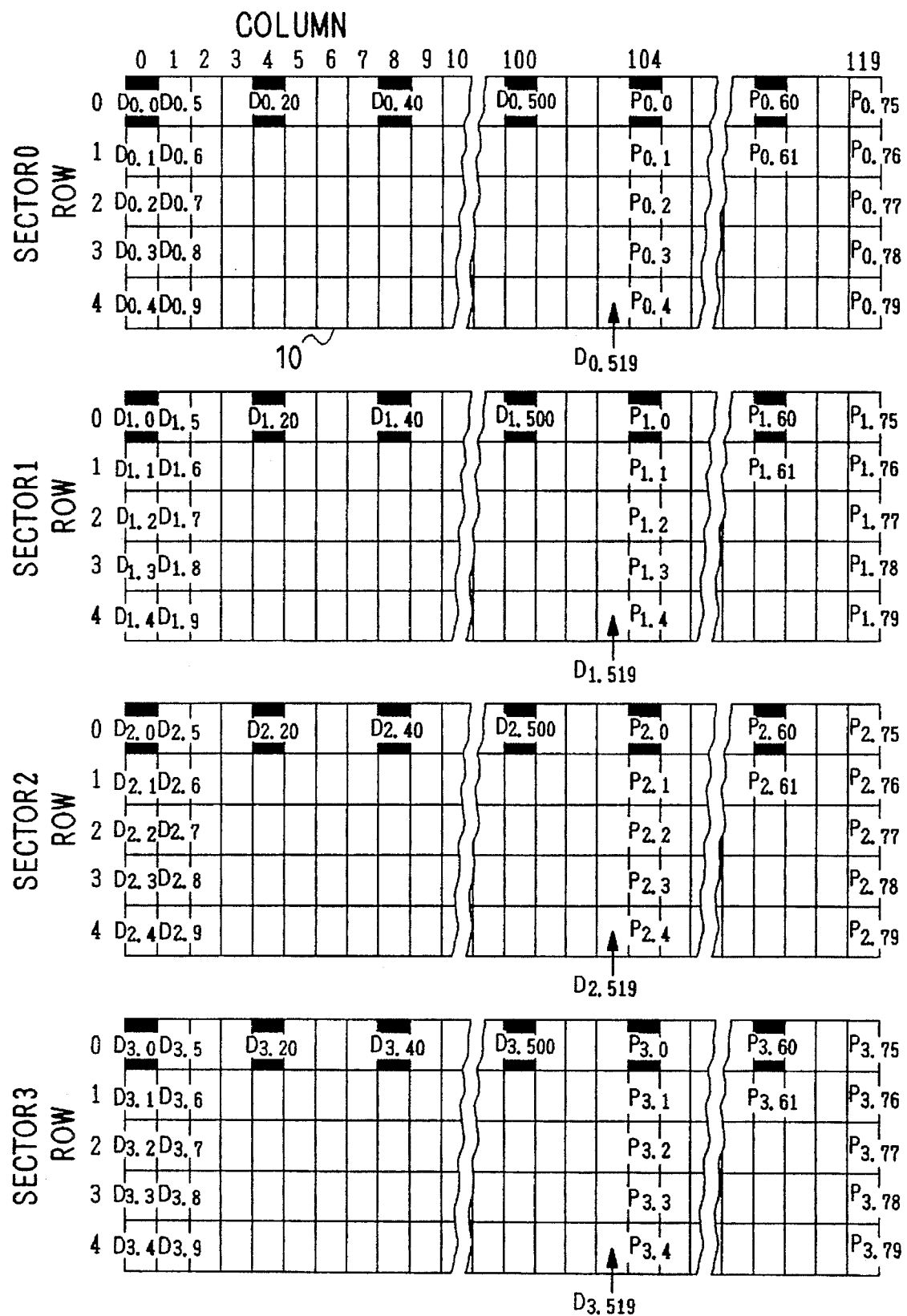
FIG. 1 shows the first embodiment in accordance with the present invention.
Figure 2:
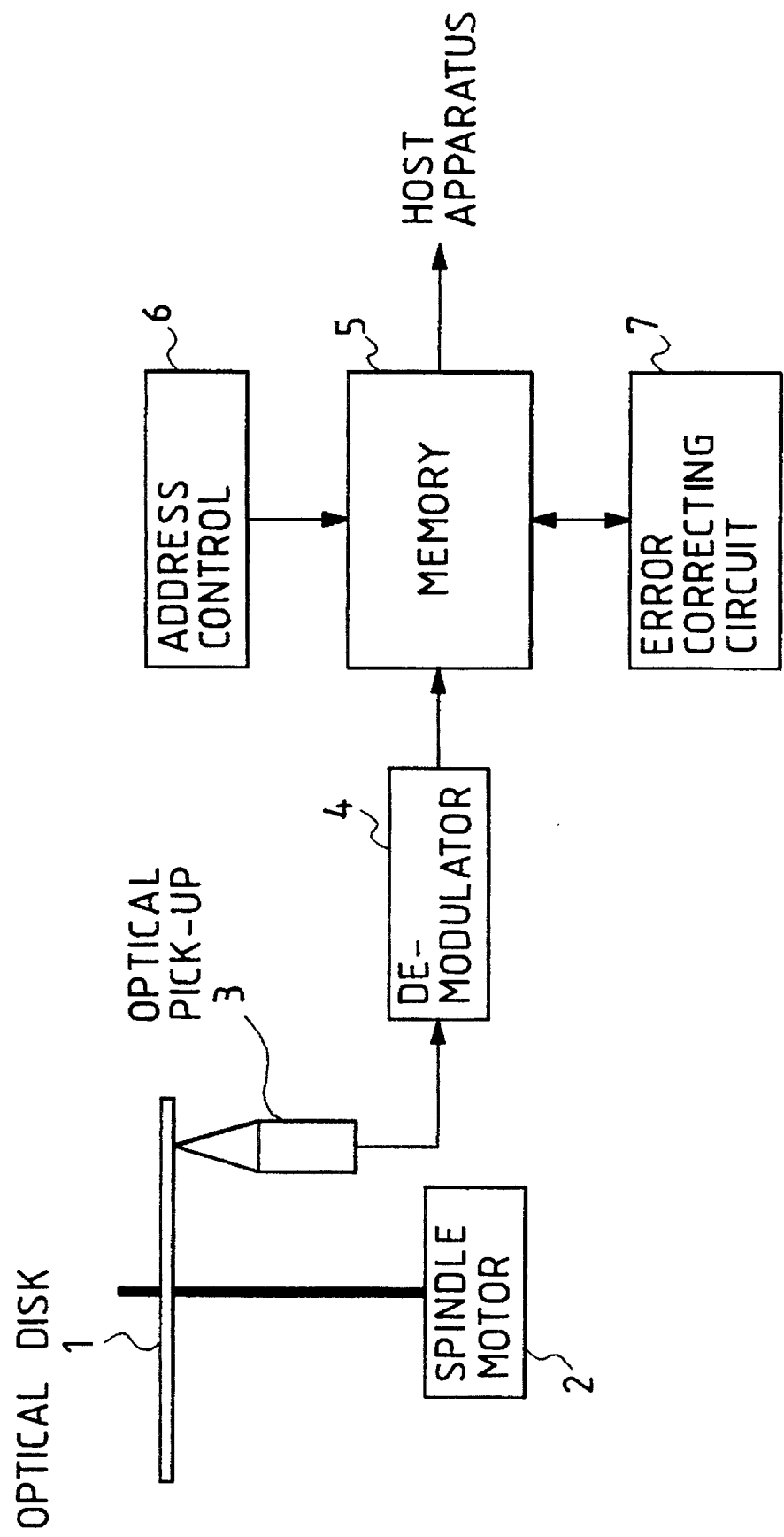
FIG. 2 shows the construction of an embodiment of a regenerating device in accordance with the present invention.

The present invention will be described below, referring to embodiments. FIG. 1 shows the first embodiment of a sector structure in accordance with the present invention. In the figure, the data construction is 512 bytes of user data, 4 bytes of vender unique data, 4 bytes of error detecting code (CRC), 80 bytes of error correcting parity. Although SYNC and RESYNC to synchronize with data are recorded in the same instance in an actual disk, they are omitted here since they do not directly relate to the present invention. In addition to these, track number and sector number are also omitted here. In FIG. 1, 600 bytes of data recorded in one sector are arranged in 5 rows from row 0 to row 4 and 120 columns from column 0 to column 119. Recording and regenerating are practically performed in order of data in row 0-column 0, row 1-column 0, row 2-column 0, . . . , row 4-column 0, row 0-column 1, row 1-column 1, . . . . Number of dispersion among sectors here is set four. The reference characters D indicate user data, vendor unique data and CRC, and the reference characters P indicate parity. The head part of the subscript in each reference character indicates the sector number, and the tail part of the subscript in each reference character indicates the number in order of which recording and regenerating are performed in each sector. Explanation will be made by taking data D0,0 as an example. Elements of data composing the same correcting sequence as the data 0,0 are 120 bytes, 104 bytes of data, D1,0, D2,0, D3,0, D0,20, D1,20, D2,20, D3,20, D0,40, . . . , D3,500, and 16 bytes of correcting codes, P0,0, P1,0, P2,0, P3,0, P0,20, . . . , P3,60. FIG. 2 shows a regenerating device. In the figure, the reference character 1 is an optical disk, the reference character 2 is a spindle motor, the reference character 3 is an optical pick-up, the reference character 4 is a demodulator, the reference character 5 is a memory circuit, the reference character 6 is an address control circuit for a data memory, and the reference character 7 is an error correcting circuit. Although in addition to these there are actually components such as a driving mechanism and a positioning mechanism for the optical pick-up, a servo circuit for controlling focus of laser light, a clock regenerating circuit for detecting data, they are omitted in the figure since they do not related to the object, the construction and the operation of the present invention. The optical disk 1 is rotated at a constant angular speed or at a constant linear speed with the spindle motor 2. The optical pick-up 3 is controlled by the driving mechanism and the positioning mechanism which are not shown in the figure so that the laser light irradiates on a track of the optical disk 1, and is also controlled by the focusing control circuit which is not shown in the figure so that the laser light is focused on the recording surface of the optical disk 1. Bit arrays obtained by modulating record data with a proper modulating method are recorded on the tracks of the optical disk 1, and the signals of the pick-up 3 regenerated from the bit arrays are demodulated with a proper rule by the demodulating circuit 4 to be reconstituted to data arrays before being modulated. The reconstituted data arrays are stored in the data memory 5 with a proper number of sectors (4 sectors in the case of FIG. 1). Then, the data is read out from the data memory 5 and executed the error correction in the error correcting circuit 7. The algorithm of error correction is not explained here because it is well known. The data of the correcting code producing sequence described above is sequentially read out to input to the error correcting circuit 7. In the example of FIG. 1 where data is dispersed in 4 sectors, there are 20 sequences of the correcting code producing sequences and the corresponding number of the correcting circuits to the correcting code producing sequences may be provided. Otherwise, it is also possible that one or a plural number of the correcting circuits are provided, and correcting operation of one sequence or a plural number of sequences is performed at a time and the error correcting operation for all the sequences is performed by repeating this operation. According to the arranging method, since the number of elements of data composing the correcting codes and the number of parities are equal to those of ECMA format, the capability of random error correction is equivalent but the capability of burst error correction can be improved. The conventional length of burst error correction is 40 bytes, but the length of burst error correction of FIG. 1 is increased to 160 bytes.

Figure 3:
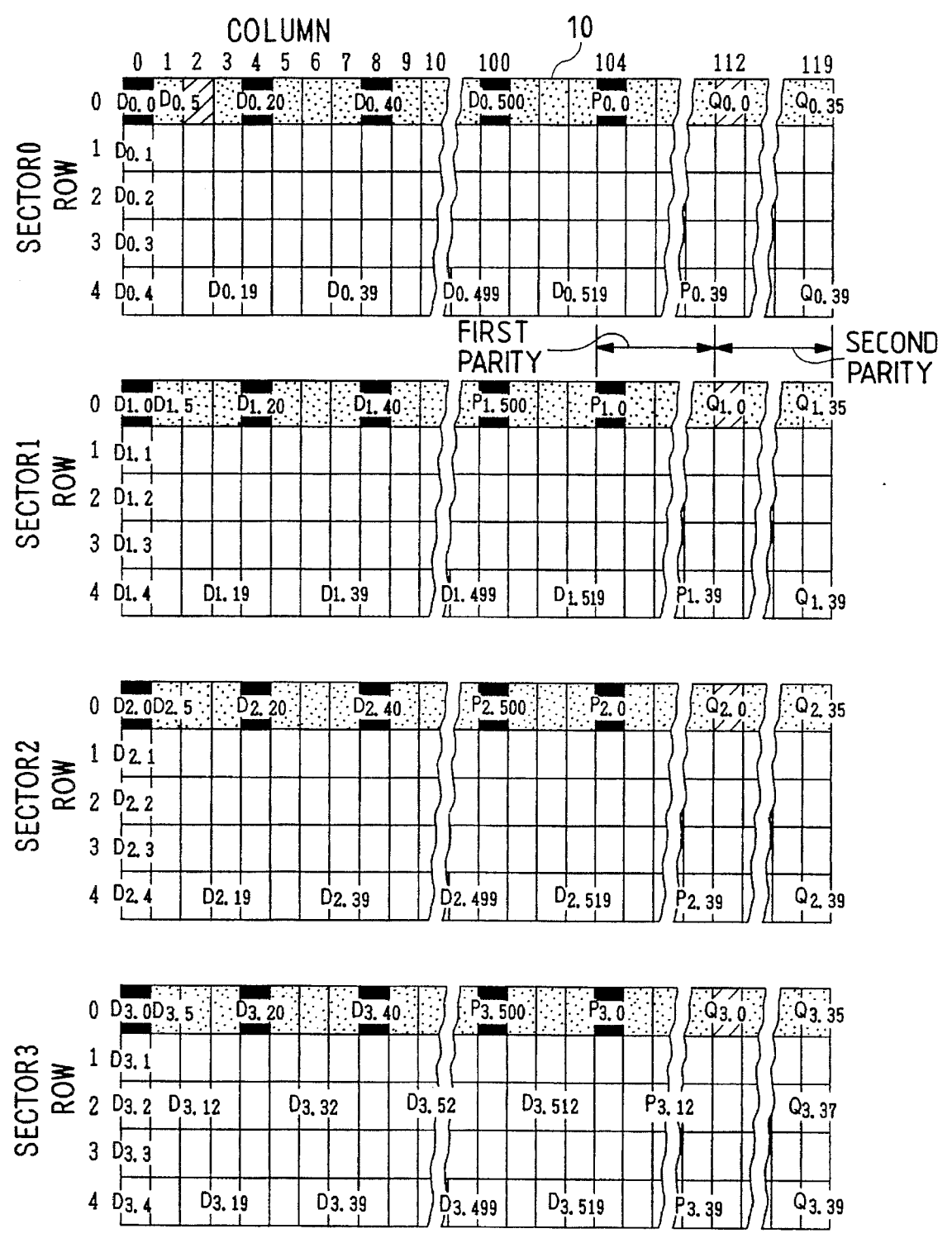

FIG. 3 shows the second embodiment in accordance with the present invention. In this embodiment, two sequences of correcting codes, first correcting codes produced by being dispersed among the sectors in the same manner as in the embodiment of FIG. 1 and second correcting codes produced inside the sector, are provided. The first correcting codes dispersed among the sectors are dispersed in the 4 sectors in a same manner as in FIG. 1, and one sector is expressed by 5 rows by 120 columns arrangement in a same manner as in FIG. 1. In FIG. 3, data is expressed by D, parity by the first correcting code is expressed by P, and parity by the second correcting code is expressed by Q. The meaning of the subscript added to the data or the parity is the same as in FIG. 1. Here, the correcting code sequence relating to D0,0 is composed of 104 bytes of data, D0,0, D1,0, D2,0, D3,0, D0,20, D1,20, D2,20, D3,20, D0,40, . . . , D3,500, and 8 parities, P0,0, P1,0, P2,0, P3,0, P0,20, . . . , P3,35. On the other hand, the second correcting code sequence composed inside sector is composed of 104 bytes of data, D0,0, D0,5, D0,10, D0,15, D0,20, D0,25, D0,30, D0,35, D0,40, . . . , D0,515, and 8 parities of the first correcting codes above, P0,0, P0,5, P0,10, P0,15, P0,20, . . . , P0,35, and 8 parities, Q0,0, Q0,5, Q0,10, Q0,15, Q0,20, . . . , Q0,35. Since each kind of the correcting code sequences can correct up to 4 byte error, after performing correction by the second correcting codes re-correction is performed using the first correcting codes. Since plural elements of data in the first correcting sequence are contained in the second correcting sequence, correction cannot be performed when error occurs in 5 elements of the data contained in both of the correcting code sequences in random error correction. Therefore, the capability of correcting random errors is decreased comparing to the conventional method. However, as to correction of burst errors, when correction cannot performed by the second error correcting sequence because of occurrence of 16 byte burst error, the error can be corrected by the first error correcting sequence. Therefore, length of burst error in the sector can be allowed as long as 80 bytes. This allowable length is twice as long as that of the conventional method.

Figure 4:
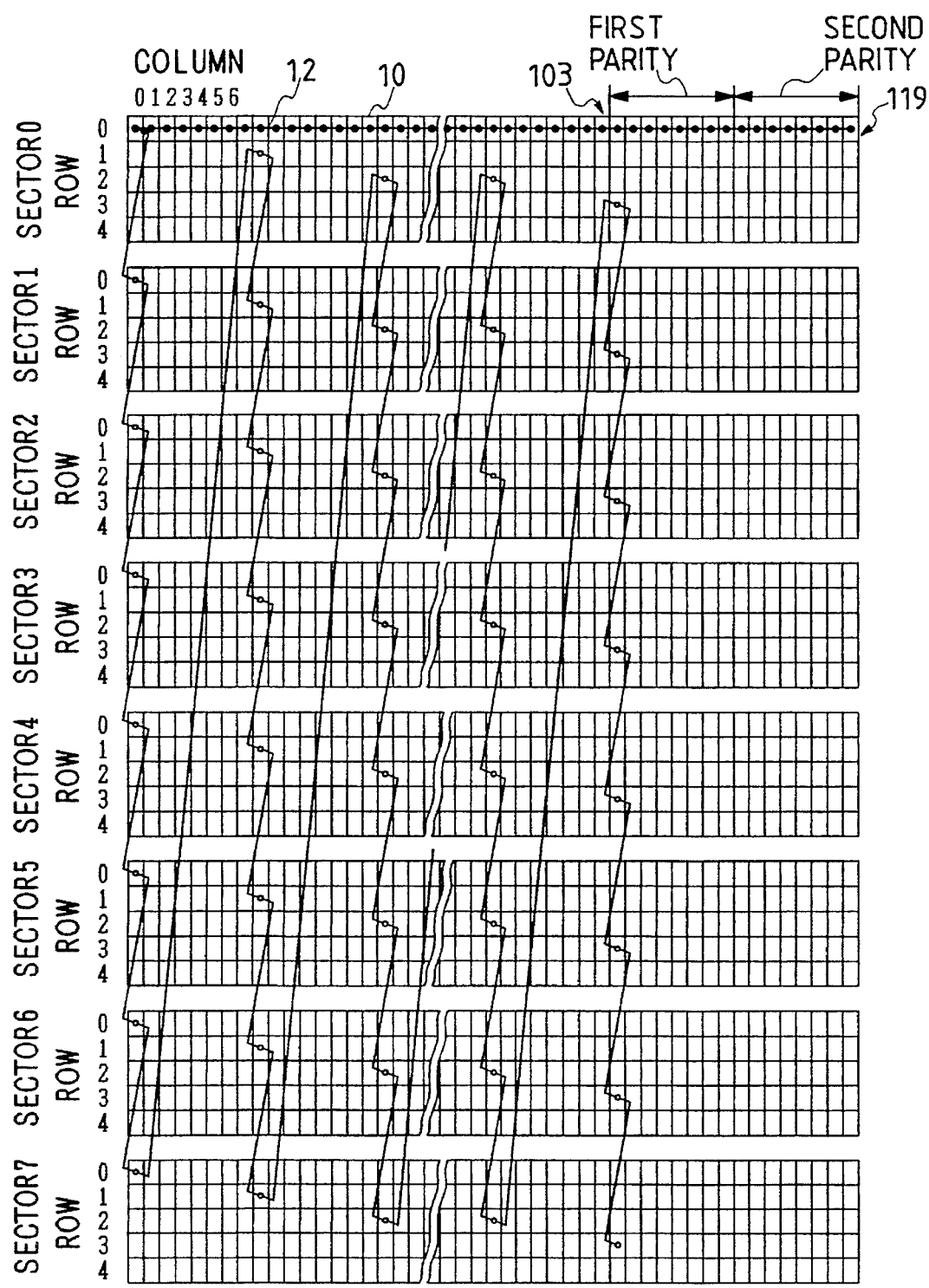
FIG. 4 shows the third embodiment in accordance with the present invention.

The third embodiment will be described below, referring to FIG. 4. In this embodiment, as to the error correcting code, the first error correcting codes dispersed among the sectors and the second error correcting codes constructed inside the sectors are provided as the same as in FIG. 3. However, in order to decrease umber of elements of data in the first error correcting code sequence also contained in the second error correcting code sequence, the elements of data composing the first error correcting sequence are arranged in shifting their positions in a sector. The data construction of the sector is composed of 520 bytes of data part and 80 bytes of parity part as the same construction as the embodiments above, and has 5 sequences of the second error correcting sequences, and one sector is expressed by arrangement of 5 rows by 120 columns. Although one error correcting sequence is composed of 104 bytes of data part and 16 bytes of parity part, 8 bytes of parities among the 16 bytes of parities are used for the first error correcting codes dispersed among the sectors to be described later and are dealt as data in the second error correcting code producing sequence concluding within the sector. Therefore, the second error correcting codes are considered to be 8 parities to 112 elements of data. On the other hand, the first error correcting codes dispersed among the sectors are composed of 8 bytes of parities to 104 bytes of data as shown in FIG. 4 by an example of the first error correcting codes dispersed among 8 sectors. For, as an example, the head data in the first sector (sector 0), that is, the data of row 0 and column 0 in the figure, the producing sequence 11 of the first error correcting code including the data is dispersed among the sectors, such as data of row 0 and column 0 in the second sector (sector 1), data of row 0 and column 0 in the third sector (sector 2), ..., data of row 0 and column 0 in the eighth sector (sector 7), data of row 1 and column 8 in the first sector (sector 0), data of row 1 and column 8 in the second sector (sector 1), ..., data of row 1 and column 8 in the eighth sector (sector 7), data of row 2 and column 16 in the first sector (sector 0), ..., the position is successively shifted by one row in each sector and is returned to row 0 after the position reaches row 4. By repeating this manner, the producing sequence uses the data elements up to row 2 and column 96 and the 8 parities added to the producing sequence are arranged in row 3 and column 104 in each os the sectors. The error correcting code sequence for other data is also constructed according to the same rule, and the total of 40 sequences are produced. On the other hand, as to the error correcting code producing sequence 12 concluding within the sector, five sequences are produced every rows respectively, and the added parities are arranged from row 112 to row 119. Number of the data element and the parities contained in one sequence of the error correcting codes dispersed among the sectors which are also contained in the same sector among the eight sectors is 4, and the number of the data element and the parities which are also contained in the same row is 2 to 3 since they are arranged by shifting one row by one row. Therefore, an error does not occur in the data elements sharing to the two kinds of the error correcting code sequences at a time to cause incapability of correction by the both sequences at a time. Thus, the correcting capability for random errors can be improved. As to the correcting capability for burst errors, the data can be corrected by the error correcting codes dispersed among the sectors even if 164 bytes of data are continuously erroneous in a sector. Although using the two kinds of error correcting code sequences as described above can improve the correcting capability for both random and burst errors, repeating of the correction can further improve the correcting capability. That is, there is a correctable error pattern by performing again using the second error correcting codes in a sector to correct the data which could not be corrected by the second error correcting codes in a sector and could not be corrected by the first error correcting codes among the sectors. Repeating this process further increases correctable data. On the contrary, in a case of low error rate, it is possible to perform correction using only the second error correcting codes in the sectors under the normal condition and to perform correction using the first error correcting codes among the sectors only when the correction cannot be performed using only the second error correcting codes.

Figure 5:
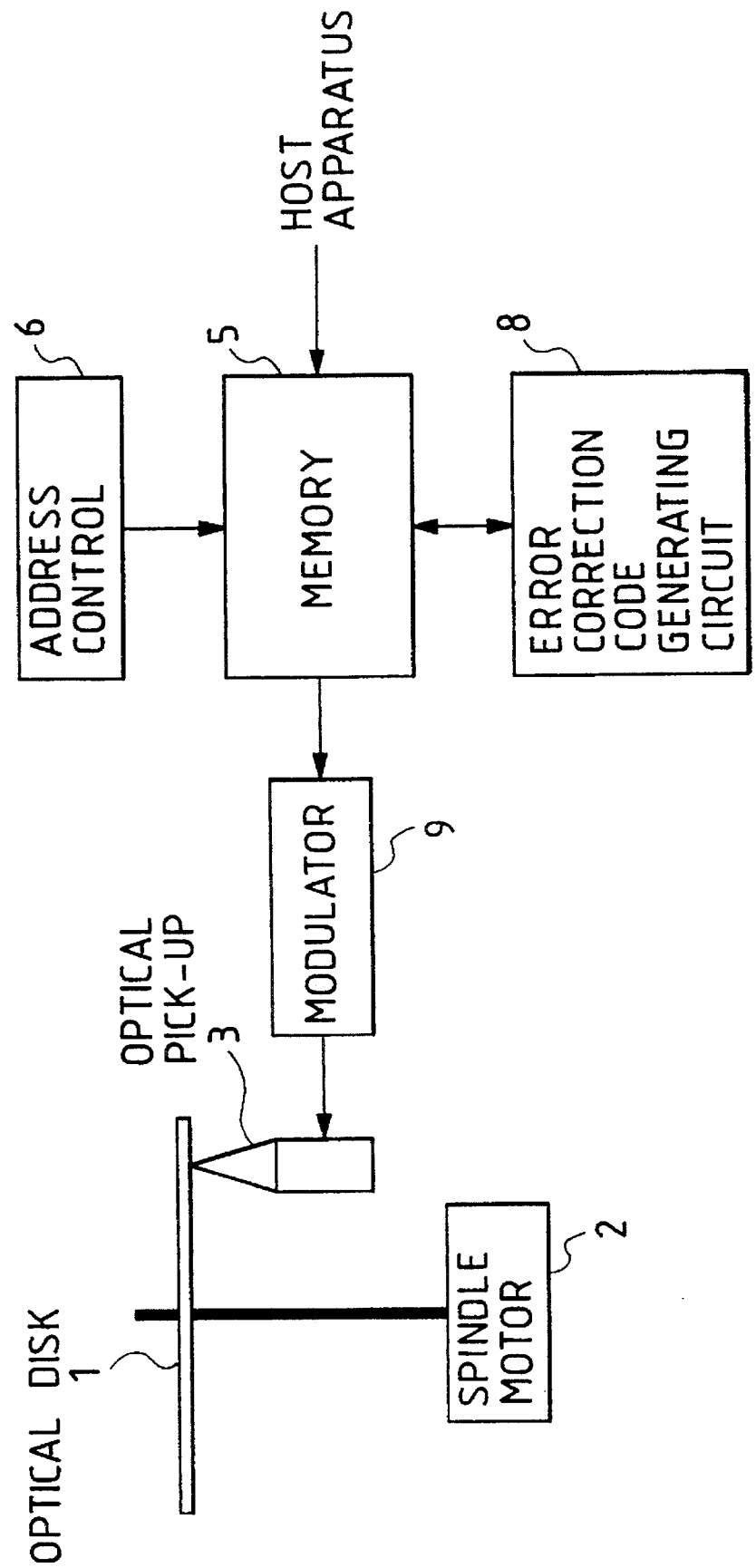
FIG. 5 shows the construction of an embodiment of a recording device in accordance with the present invention.

Recording method will be described below. FIG. 5 is a block diagram of a recording circuit. The parts not directly relating to the present invention are omitted here as in FIG. 2. And the same part in FIG. 2 is indicated by the same referring character. Data transmitted from a host device, not shown, is stored in a memory circuit 5, and error correcting codes are produced in an error correcting code producing circuit 8 when data for a given number of sectors to disperse the error correcting codes is acquired. In the embodiment of FIG. 1, a memory address controlling circuit reads out data elements in given positions and inputs them into the error correcting control circuit 8. When a given number of data elements are input and parities are produced, the parities are read out from the error correcting code producing circuit 8 and stored in a given positions of the memory circuit 5. After this process is performed to all the code sequences to produce all the parities, the driving device is turned to the recording state, the modulating circuit 9 modulates the data and the parities for all the sectors stored in the memory circuit with a proper modulating method to modulate the power of the laser light of the optical pick-up 3 to record the data and the parities on the optical disk 1. When the data transmitted from the host device cannot be recorded once of the operation described above, the operation is repeated to record all of the data. When the data to be recorded is less than the amount of the recordable data in once of the above operation, that is, the amount of the recordable data in the dispersed sectors, pseudo-data, for instance, fixed data is used to fill the shortage of data to perform recording. In a case where two kinds of the error correcting codes, inside sector and among sectors as described in the embodiments of FIG. 3 and FIG. 4, after storing the data for a given number of sectors in the memory circuit, the error correcting codes dispersed among the sectors are produced as described above, and the error correcting codes concluding inside each of the sectors are produced, and then they are recorded. Since each group of data instructed to be recorded by a host device can be recorded with the method according to the present invention in the recording method described above, it is possible to perform recording by applying the present invention to a write-once recording medium or a rewritable recording medium. Further, since there is no need to read out an unnecessary sector for only correction during regenerating, time for reading out data can be shortened. Furthermore, since sectors to be recorded are not required to be actually continuous by managing to clarify the sector position order on a recording medium to be written in, it is possible to use the recording medium effectively. Although a recording circuit of laser power modulating type is shown in FIG. 5, in an opto-magnetic disk device the present invention can be realized by a recording circuit of magnetic field modulating type where the magnetic field polarity of a magnetic head is varied according to the recording data while a constant recording laser light is being irradiated, or a recording circuit of a type where both of laser power and magnetic field are modulated.

As to another type of recording, in a case where data to be recorded on a recording medium is determined in advance such as in a case of manufacturing a read only memory medium, it is possible to record data by applying the present invention to each of the continuous sectors on the recording medium in regardless of the group unit of the data. In this recording method, it is preferable that number of the sectors dispersing the error correcting codes is set to number of sectors recordable in one track or number of sectors divided the recording medium by an integer in equal parts. By setting such a manner, it is possible to easily identify the head of the sector and the block to perform correction at regenerating time and the correcting operation can be concluded by one track. Therein, the track or the sector is not always necessary to be a physical track or a physical sector defined by one torn of the recording medium. In a recording medium used a constant rotating speed of the recording medium and at the same time a constant recording and regenerating period, number of the sectors in the physical tracks is constant from the outer circle to the inner circle. However, in a recording medium performing recording and regenerating at a constant linear speed or a recording medium dividing the medium into plural zones and varying the rotating speed or the recording and regenerating period depending on the zone, the group of fixed number of sectors is defined as theoretical track and the physical track is not used in mast cases since number of sectors in the physical track varies depending on the radial position or the zone in the recording medium. Therefore, in this case, it is preferable that number of the sectors dispersing the error correcting codes is set to number of sectors composing the theoretical track or number of sectors divided the recording medium by an integer in equal parts. The recording device in this case can be realized by the construction shown in FIG. 5. There is another realizing means where a memory device capable of storing all the data and the parities to be recorded is provided, parities for all the data are produced and stored in the memory device in advance, and these are continuously read out to record. In this moment, producing of the error correcting codes may be performed by calculation with software using a computer.

In each of the embodiments having been described above, the error correcting codes used may be the same as conventional error correcting codes composing sectors, and a conventional code producing circuit and a conventional correcting circuit may be also used as the code producing circuit and the correcting circuit. Therefore, it is also possible to easily share a recording device, regenerating device and a recording and regenerating device with the write-once recording medium or the rewritable recording medium, and a read only medium of conventional format which are not applied with the present invention.

Although the present invention has been described based on the embodiments, the sector constructions, the error correcting code constructions, the number of dispersing sectors are examples. The present invention is not limited to these examples, and can be realized in the other sector constructions, in the other error correcting code constructions, and in the other number of dispersing sectors.

What is claimed is:

1. An information recording medium for recording data by constructing sectors of recording units with groups having a given number of elements of data, wherein an error correcting block is constructed with a plurality of sectors, an error correcting sequence being constructed by combining data elements of the plurality of sectors using a group of data formed by collecting a given number of elements of data from each of the plurality of sectors, contained in said error correcting block, error correcting codes being produced to said error correcting sequence, said error correcting codes being dispersedly stored in the plurality of sectors in said error correcting block.

2. An information recording medium according to claim 1, wherein a plurality of error correcting sequences are constructed in the error correcting block, error correcting codes produced to each of the error correcting sequences being dispersedly stored in respective sectors in said error correcting block.

3. An information recording medium according to claim 2, wherein when the number of elements of data to be recorded is less than the number of elements of data capable of recording in the error correcting block, the error correcting block is constructed by supplying fixed data.

4. An information recording medium for recording data by constructing sectors of recording units with groups having a given number of elements of data, wherein an error correcting block is constructed with a plurality of sectors, a first error correcting sequence being constructed by combining data elements of the plurality of sectors using a group of data formed by collecting a given number of elements of data from each of the plurality of sectors contained in said error correcting block, first error correcting codes being produced to said first error correcting sequence, said first error correcting codes being dispersedly stored in each of the plurality of sectors in said error correcting block, a second error correcting sequence being constructed for each of the sectors using a group of data formed by collecting a given number of elements of data from each of the sectors, said second error correcting codes being produced to said second error correcting sequence, said second error correcting codes being recorded in the sector containing the data producing said second error correcting codes.

5. An information recording medium according to claim 4, wherein each of the first error correcting code and the second correcting code has a plurality of error correcting code sequences, the first error correcting code sequences being constructed such that the number of elements of data shared by the first error correcting code sequences and the second error correcting code sequences is less than the number of elements of data incapable of correcting by the first error correcting code sequences and the second error correcting code sequences.

6. An information recording medium according to claim 4, wherein when the number of elements of data to be recorded is less than the number of elements of data capable of recording in the error correcting clock, the error correcting block is constructed by supplying fixed data.

7. An information recording medium according to claim 6, wherein the error correcting block starts from a sector containing first data of data to be recorded, all said data being recorded with being contained by at least one of the error correcting blocks, the sector constructing each of the error correcting blocks being arranged in an arbitrary position on the medium.

8. An information recording medium according to claim 4, wherein the number of sectors contained in the error correcting block is equal to the number of sectors contained in one physical track of the recording medium or the number of sectors dividing the physical track in equal parts with an integer.

9. An information recording medium according to claim 8, wherein recording is performed continuously on the sectors contained in the error correcting block.

10. An information recording medium according to claim 4, wherein the number of sectors contained in the error correcting block is equal to the number of sectors contained in one logical track of the recording medium or the number of sectors dividing a physical track in equal parts with an integer.

11. An information recording medium according to claim 10, wherein recording is performed continuously on the sectors contained in the error correcting block.

12. An information regenerating device using an information recording medium for recording data by constructing sectors of recording units with groups having a given number of elements of data comprising the steps of, constructing an error correcting block with a plurality of the sectors, constructing an error correcting sequence by combining data elements of the plurality of sectors using a group of data formed by collecting a given number of elements of data from each of the plurality of sectors contained in said error correcting block, producing error correcting codes to said error correcting sequence, dispersedly storing said error correcting codes in each of the plurality of sectors in said error correcting block, wherein error correction of data reproduced from said information recording medium is performed in each of the error correcting sequences using said error correcting code.

13. An information regenerating device using an information recording medium for recording data by constructing sectors of recording units with groups having a given number of elements of data comprising the steps of, constructing an error correcting block with a plurality of sectors, constructing a first error correcting sequence by combining data elements of the plurality of sectors using a group of data formed by collecting a given number of elements of data from each of the plurality of sectors contained in said error correcting block, producing first error correcting codes to said first error correcting sequence, dispersedly storing said first error correcting codes in each of the plurality of sectors in said error correcting block, constructing a second error correcting sequence for each of the sectors using a group of data formed by collecting a given number of elements of data from each of the sectors, producing second error correcting codes to said second error correcting sequence, recording said second error correcting codes in the sector containing the data producing said second error correcting codes, wherein error correction of data regenerated from said information recording medium is produced to the first error correcting sequence in said error correcting block using said first error correcting code and to the second error correcting sequence using said second error correcting code.

14. An information regenerating device according to claim 13, wherein the correcting operation by the second error correcting code and the correcting operation by the first error correcting code are performed alternatingly and repeatedly.

15. An information regenerating device according to claim 13, wherein the correcting operation by the first error correcting code is performed only when data incapable of correcting appears in the correcting operation by the second error correcting code.

16. An information recording device using an information recording medium for recording data by constructing sectors of recording units with groups having a given number of elements of data, wherein an error correcting block is constructed with a plurality of sectors, an error correcting sequence being constructed by combining data elements of the plurality of sectors using a group of data formed by collecting a given number of elements of data from each of the plurality of sectors contained in said error correcting block, error correcting codes being produced to said error correcting sequence, said error correcting codes being dispersedly stored in each of the plurality of sectors in said error correcting block.

17. An information recording device according to claim 16, wherein when the number of elements of data to be recorded is less than the number of elements of data capable of recording in the error correcting block, the error correcting block is constructed by supplying fixed data.

18. An information recording device using an information recording medium for recording data by constructing sectors of recording units with groups having a given number of elements of data, wherein an error correcting block is constructed with a plurality of sectors, a first error correcting sequence being constructed by combining data elements of the plurality of sectors using a group of data formed by collecting a given number of elements of data from each of the plurality of sectors contained in said error correcting block, first error correcting codes being produced to said first error correcting sequence, said first error correcting codes being dispersedly stored in each of the plurality of sectors in said error correcting block, a second error correcting sequence being constructed for each of the sectors using a group of data formed by collecting a given number of elements of data from each of the sectors, second error correcting codes being produced to said second error correcting sequence, said second error correcting codes being recorded in the sector containing the data producing said second error correcting codes.

19. An information recording device according to claim 18, wherein each of the first error correcting code and the second correcting code has a plurality of error correcting code sequences, the first error correcting code sequences being constructed such that the number of elements of data shared by the first error correcting code sequences and the second error correcting code sequences is less than the number of elements of data incapable of correcting by the first error correcting code sequences and the second error correcting code sequences.

20. An information recording device according to claim 18, wherein when the number of elements of data to be recorded is less than the number of elements of data capable of recording in the error correcting block, the error correcting block is constructed by supplying fixed data.

21. An information recording device according to claim 20, wherein the error correcting block starts from a sector containing first data of data to be recorded, all said data being recorded with being contained by at least one of the error correcting blocks, the sector constructing each of the error correcting blocks being arranged in an arbitrary position on the medium.

22. An information recording device according to claim 18, wherein the number of sectors contained in the error correcting block is equal to the number of sectors contained in one physical track of the recording medium or the number of sectors dividing the physical track in equal parts with an integer.

23. An information recording device according to claim 22, wherein recording is performed continuously on the sectors contained in the error correcting block.

24. An information recording device according to claim 18, wherein the number of sectors contained in the error correcting block is equal to the number of sectors contained in one logical track of the recording medium or the number of sectors dividing a physical track in equal parts with an integer.

25. An information recording device according to claim 24, wherein recording is performed continuously on the sectors contained in the error correcting block.

* * * * *

UNITED STATES PATENT AND TRADEMARK OFFICE
CERTIFICATE OF CORRECTION

PATENT NO. : 5,586,108
DATED : December 17, 1996
INVENTOR(S) : Hoshino

It is certified that error appears in the above-identified patent and that said Letters Patent is hereby corrected as shown below:

<u>Column 9,</u>
Lines 12-47, please amend claims 12 and 13 as set forth below:
12. An information regenerating device using an information recording medium having a data recorded by a method comprising the steps of constructing sectors of recording units with groups having a given number of elements of data, constructing an error correcting block with a plurality of the sectors, constructing an error correcting sequence by combining data elements of the plurality of sectors using a group of data formed by collecting a given number of elements of data from each of the plurality of sectors contained in said error correcting block, producing error correcting codes to said error correcting sequence, dispersedly storing said error data formed by collecting a given number of elements of data from each of the plurality of sectors contained in said error correcting block, producing first error correcting codes to said first error correcting sequence, dispersedly storing said first error correcting codes in each of the plurality of sectors in said error correcting block, constructing a second error correcting sequence for each of the sectors using a group of data formed by collecting a given number of elements of data from each of the sectors, producing second error correcting codes to said second error correcting sequence, recording said second error correcting codes in the sector containing the data producing said second error correcting codes, wherein error correction of data regeneration from said information recording medium is produced to the first error correcting sequence in said error correcting block using said first error correcting code and to the second error correcting sequence using said second error correcting code.

UNITED STATES PATENT AND TRADEMARK OFFICE
CERTIFICATE OF CORRECTION

PATENT NO.    : 5,586,108
DATED         : December 17, 1996
INVENTOR(S)   : Hoshino It is certified that error appears in the above-identified patent and that said Letters Patent is hereby corrected as shown below:

13.     An information regenerating device using an information recording medium having a data recorded by a method comprising the steps of constructing sectors of recording units with groups having a given number of elements of data, constructing an error correcting block with a plurality of sectors, constructing a first error correcting sequence by combining data elements of the plurality of sectors using a group of correcting codes in each of the plurality of sectors in said error correcting block, wherein error correction of data reproduced from said information recording medium is performed in each of the error correcting sequences using said error correcting code.

Signed and Sealed this

Twenty-seventh Day of May, 2003

JAMES E. ROGAN
*Director of the United States Patent and Trademark Office*

UNITED STATES PATENT AND TRADEMARK OFFICE
CERTIFICATE OF CORRECTION

PATENT NO.    : 5,586,108
DATED         : December 17, 1996
INVENTOR(S)   : Hoshino It is certified that error appears in the above-identified patent and that said Letters Patent is hereby corrected as shown below:

<u>Column 9,</u>
Lines 12-47, please amend claims 12 and 13 as set forth below:

12.    An information regenerating device using an information recording medium having a data recorded by a method comprising the steps of constructing sectors of recording units with groups having a given number of elements of data, constructing an error correcting block with a plurality of the sectors, constructing an error correcting sequence by combining data elements of the plurality of sectors using a group of data formed by collecting a given number of elements of data from each of the plurality of sectors contained in said error correcting block, producing error correcting codes to said error correcting sequence, dispersedly storing said error correcting codes in each of the plurality of sectors in said error correcting block, wherein error correction of data reproduced from said information recording medium is performed in each of the error correcting sequences using said error correcting code.

13.    An information regenerating device using an information recording medium having a data recorded by a method comprising the steps of constructing sectors of recording units with groups having a given number of elements of data, constructing an error correcting block with a plurality of sectors, constructing a first error correcting sequence by combining data elements of the plurality of sectors using a group of data formed by collecting a given number of elements of data from each of the plurality of sectors contained in said error correcting block, producing first error correcting codes to said first error correcting sequence, dispersedly storing said first error correcting codes in each of the plurality of sectors in said error correcting block, constructing a second error correcting sequence for each of the sectors using a group of data formed by collecting a given number of elements of data from each of the sectors, producing second error correcting codes to said second error correcting sequence, recording said

UNITED STATES PATENT AND TRADEMARK OFFICE
CERTIFICATE OF CORRECTION

PATENT NO.    : 5,586,108
DATED         : December 17, 1996
INVENTOR(S)   : Hoshino It is certified that error appears in the above-identified patent and that said Letters Patent is hereby corrected as shown below:

<u>Column 9 (cont'd),</u>
second error correcting codes in the sector containing the data producing said second error correcting codes, wherein error correction of data regeneration from said information recording medium is produced to the first error correcting sequence in said error correcting block using said first error correcting code and to the second error correcting sequence using said second error correcting code.

This certificate supersedes Certificate of Correction issued May 27, 2003.

Signed and Sealed this

Fifteenth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 5,586,108
DATED : December 17, 1996
INVENTOR(S) : Hoshino

It is certified that error appears in the above-identified patent and that said Letters Patent is hereby corrected as shown below:

Column 9,
Lines 12-47, please amend claims 12 and 13 as set forth below:
12. An information regenerating device using an information recording medium having a data recorded by a method comprising the steps of constructing sectors of recording units with groups having a given number of elements of data, constructing an error correcting block with a plurality of the sectors, constructing an error correcting sequence by combining data elements of the plurality of sectors using a group of data formed by collecting a given number of elements of data from each of the plurality of sectors contained in said error correcting block, producing error correcting codes to said error correcting sequence, dispersedly storing said error correcting codes in each of the plurality of sectors in said error correcting block, wherein error correction of data reproduced from said information recording medium is performed in each of the error correcting sequences using said error correcting code.

13. An information regenerating device using an information recording medium having a data recorded by a method comprising the steps of constructing sectors of recording units with groups having a given number of elements of data, constructing an error correcting block with a plurality of sectors, constructing a first error correcting sequence by combining data elements of the plurality of sectors using a group of data formed by collecting a given number of elements of data from each of the plurality of sectors contained in said error correcting block, producing first error correcting codes to said first error correcting sequence, dispersedly storing said first error correcting codes in each of the plurality of sectors in said error correcting block, constructing a second error correcting sequence for each of the sectors using a group of data formed by collecting a given number of elements of data from each of the sectors, producing second error correcting codes to said second error correcting sequence, recording said

UNITED STATES PATENT AND TRADEMARK OFFICE
CERTIFICATE OF CORRECTION

PATENT NO.    : 5,586,108
DATED         : December 17, 1996
INVENTOR(S)   : Hoshino It is certified that error appears in the above-identified patent and that said Letters Patent is hereby corrected as shown below:

Column 9 (cont'd),
second error correcting codes in the sector containing the data producing said second error correcting codes, wherein error correction of data regenerated from said information recording medium is produced to the first error correcting sequence in said error correcting block using said first error correcting code and to the second error correcting sequence using said second error correcting code.

This certificate supersedes Certificate of Correction issued June 15, 2004.

Signed and Sealed this

Twentieth Day of July, 2004

JON W. DUDAS
*Acting Director of the United States Patent and Trademark Office*